INVENTORS
CLIFFORD F. KENNEDY
ELMO E. AYLOR
BY
Stuart W. Wohlgemuth
ATTORNEY

June 27, 1967

C. F. KENNEDY ET AL 3,328,224

APPARATUS FOR MAKING PLASTIC PIPE

Filed June 4, 1963

INVENTORS
CLIFFORD F. KENNEDY
BY  ELMO E. AYLOR

*Stuart W. Wohlgemuth*
ATTORNEY

INVENTORS
CLIFFORD F. KENNEDY
BY ELMO E. AYLOR

Stuart W. Wohlgemuth
ATTORNEY

June 27, 1967

C. F. KENNEDY ET AL 3,328,224

APPARATUS FOR MAKING PLASTIC PIPE

Filed June 4, 1963

INVENTORS
CLIFFORD F. KENNEDY
BY ELMO E. AYLOR

*Stuart W. Wohlgemuth*
ATTORNEY

United States Patent Office 3,328,224
Patented June 27, 1967

3,328,224
APPARATUS FOR MAKING PLASTIC PIPE
Clifford F. Kennedy, Simi, and Elmo E. Aylor, Woodland Hills, Calif., assignors to North American Aviation, Inc.
Filed June 4, 1963, Ser. No. 285,464
11 Claims. (Cl. 156—382)

The present invention relates to an apparatus and method for the manufacture of continuous piping. More particularly, the invention pertains to the manufacture and method of making continuous fiber-reinforced plastic piping.

Plastic piping as referred to embraces pipe made using fibers bonded together by curable resinous material. Using previous apparatus for manufacture of plastic piping, the piping normally rotates about the mandrel on which it is formed. As a result, the length of piping produced from the machine was inherently limited in length because of the continuous rotation thereof. Such a feature prohibited the laying down of long continuous plastic pipes for underground systems. Another deficiency in previous devices and methods of producing fiber-reinforced plastic pipe was the mandrel upon which the fibers are packed and resin applied was not adequately lubricated and as a result the piping, due to the resinous material, would adhere thereto causing various shut-downs in operation to clean off the mandrel. In fact, the various methods for advancing the plastic piping on the mandrel would become clogged with resinous binder material and eventually require a cleaning shut-down of the device. A further serious deficiency in prior existing devices was that in the curing step for forming the fiber-reinforced plastic pipe, no pressure or inadequate pressure was maintained on both the external and internal surfaces of the pipe during this curing. As a result of such inadequacies in the pressure maintained in the piping being cured, the adherency of the above binder to the fibrous material used was inadequate at times and provided for inconsistencies in the pipe produced.

It is an object of this invention to provide an apparatus for the continuous manufacture of plastic pipe wherein the piping does not rotate during the process of manufacture thus enabling the production of virtually an infinite length thereof.

Another object of this invention is to provide an apparatus or method for producing continuous plastic piping wherein external and internal pressure is maintained on the piping formed during the curing operation producing a piping having excellent consistency and strength properties.

A still further object of this invention is to provide an apparatus and method for producing plastic piping wherein the surface of the mandrel upon which the piping is formed is continuously lubricated.

One other object of this invention is to provide a novel mandrel upon which the plastic piping can be produced which mandrel provides for the lubrication of the piping formed thereon. Additionally, such novel mandrel can provide for the internal coating of the piping formed with the resinous binder material utilized in the production of the plastic piping.

A still further object of this invention is to provide a novel means for applying internal pressure to the piping being formed during the curing stage in the manufacture or curing process.

One further object of the invention is to provide a method and apparatus for providing a novel plastic piping having reinforcing fibers running both longitudinally and circumferentially about the pipe.

With the above objects in mind, the apparatus of the invention comprises a stationary mandrel upon which is laid reinforcing fibers in a longitudinal direction about the circumference thereof. After the means for providing the longitudinal fibers, means can be optionally provided for applying a liner material about the circumference of the tubing being formed. Next, a plurality of means is provided for circumferentially winding of a plurality of reinforcing fibers about the circumference of the piping over the liner material. These particular fibers may be pre-impregnated with the resinous material or alternatively, as will be shown, can be impregnated with the resinous binder at the time of application to the mandrel. Piping formed at this point is then pulled by means into the heating region of the apparatus where the resin is cured. Upon ejection from the heating region of the apparatus, a solidified end product is obtained.

One of the particular features of the invention is the mandrel area from a point where the fibers are laid down longitudinally to the area just prior to entering the heating region. The mandrel in this particular area is preferably comprised of a porous material and has a hollow center portion. Through this hollow center portion a resinous material which may be utilized as additional binder is forced under pressure such that it seeps through the porous mandrel coating the fibers laid down thereon and additionally serving the important function of lubricating the material being formed as it slides along the mandrel. A storage tank is connected at one end of the porous mandrel which serves to supply the resin or lubricating material to the center portion thereof.

Another particular feature of the invention resides in the flexible band which encloses completely the piping formed on the mandrel throughout the heating region and serves to maintain pressure thereon. Within the heating region itself, the mandrel has a flexible surface which expands outwardly under pressure so as to maintain compression on the inner surface of the piping being cured in this region.

An additional feature of the apparatus and method described is that the fibers comprising such pipe are continuous in a longitudinal direction throughout the entire length of the pipe in addition to fibers being wound circumferentially about the pipe. This particular feature provides for plastic pipe of unusual high strength characteristics in all directions.

It is believed that the aspects of the invention will be better understood from the following detailed description when taken together with the accompanying drawings in which.

Figure 1:
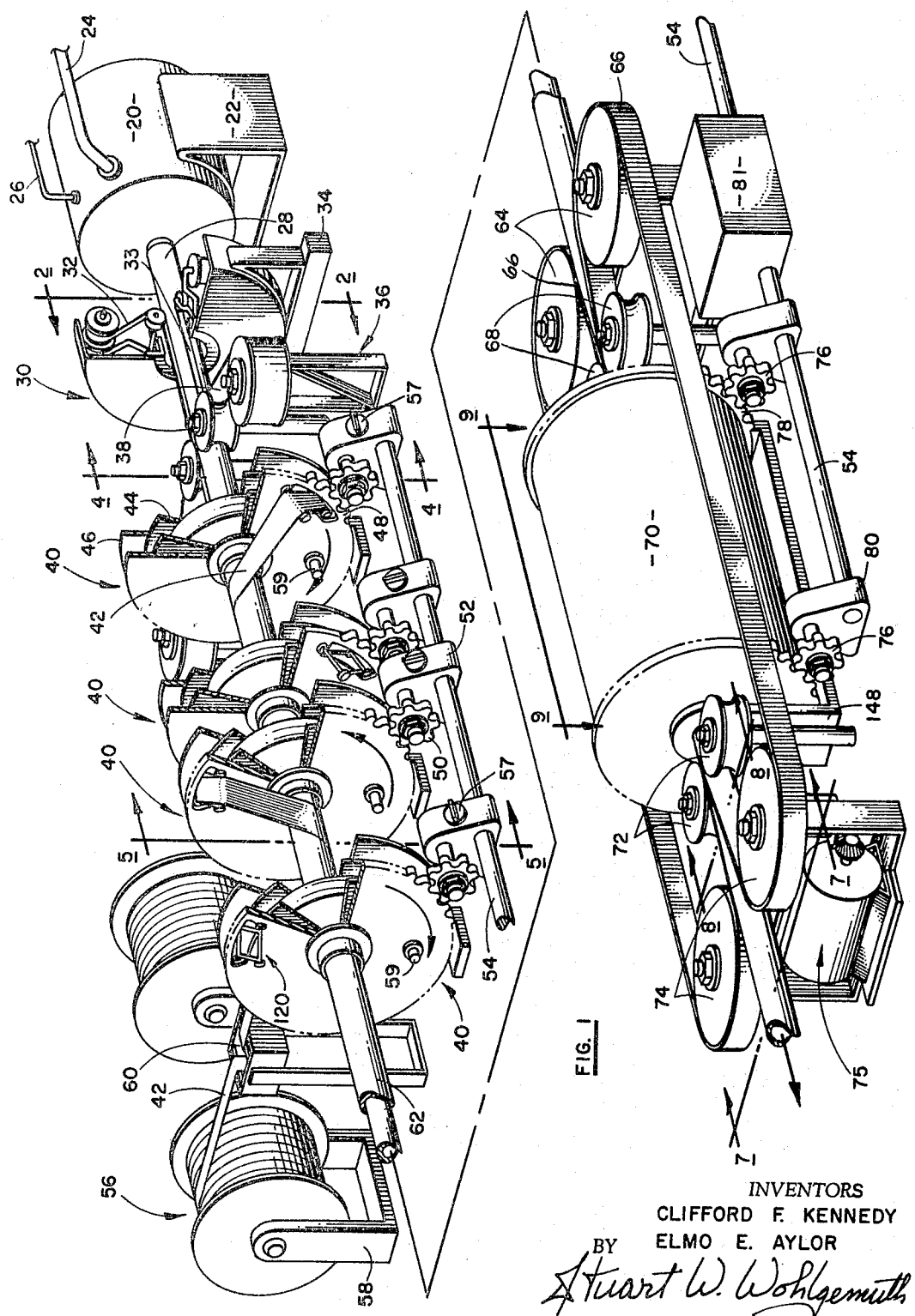
FIG. 1 is a partially-sectioned perspective view of the machine of this invention for continuously forming plastic piping.

Turning now to the figures, there is shown in FIG. 1 a pictorial representation of the complete continuous pipe-forming apparatus of this invention. Briefly, the device comprises a storage tank 20 containing the binder-lubricant material utilized in the process of forming the pipe. The tank is seated on a support structure 22. Inlet line 24 to the tank serves to admit the material utilized as well as maintain it under the necessary pressure for forcing it within the mandrel. The inlet line 26 admits a fluid used in the heating portion of the device as will later be described. Connected to the end of the tank 20 is the mandrel 28. The mandrel 28 is rigidly affixed to the tank 20 permitting the discharge of the fluid in the tank in the mandrel as will be explained further in the discussion. The device 30 for laying the longitudinal fibers 32 upon the mandrel is seated on a base structure 34 adjacent the end of the tank 20.

After the longitudinal fibers 32 have been laid upon the mandrel as at 33, a device 36 for placing a liner material 38 in the form of longitudinal tape half shells on top of the longitudinal fibers is actuated. Following the placing of the liner material 38 upon the mandrel, a plurality of spindle mechanisms 40 are disposed about the mandrel with their center axis corresponding to that of the mandrel's axis. As the spindle mechanisms 40 rotate about the mandrel, they lay down upon it a plurality of circumferential fibers 42. The spindle mechanisms have an inner reel 44 and an outer reel 46. The outer reel is provided with a geared tooth edge 48 along preferably one edge of its circumference. The outer reel 46 is engaged with a gear 50 connected to gear box 52. The spindles are coordinated and synchronized by connecting the gear boxes to shaft 54 which is taken off motor 81. Storage rollers 56 are provided on mounting 58 to supply additional circumferential fibers 42 to the spindle mechanisms as will be later described. The fibers 42 may be pre-impregnated with resin or alternatively may pass through an impregnation bath 60 prior to being wound on the spindle mechanisms.

The uncured pipe 62 upon leaving the last of the spindle mechanisms 40 passes between two rollers 64. The rollers 64 serve to guide endless metal belts 66 onto the surface of the uncured pipe. A second set of forming rollers 68 form or bend the metal belts tightly about the circumference of the unformed pipe. After the metal belts or bands are tightly formed about the uncured pipe, the pipe then passes into a heater apparatus 70 wherein it is cured to a final state. Leaving the heater device 70, the pipe passes between additional forming rollers 72 and belt support rollers 74 so that the belts are then removed from the then-formed solid pipe. The second set of belt support roller 74 are driven by a motor and gear arrangement 75. As shown, a pair of gears 76 engage geared tooth outer circumference 78 at the ends of the heater device which will drive or cause rotation of this device. The gears 76 are connected to gear reduction boxes 80. The boxes are driven by a motor 81. This motor must be synchronized with motor 133 or alternatively one motor and appropriate gear system may drive the entire machine. The motor 81 additionally drives through shaft 54 the gears 50 for rotating the spindle mechanisms.

Figure 2:
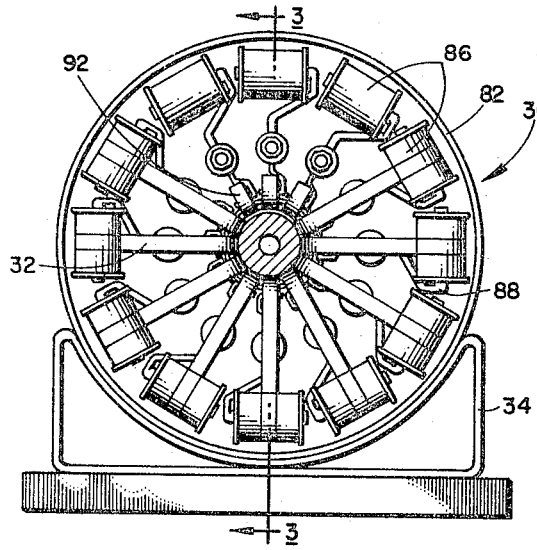
FIG. 2 is a view taken along section line 2—2 of FIG. 1 showing in detail the means for laying the longitudinal fibers upon the mandrel.
Figure 3:
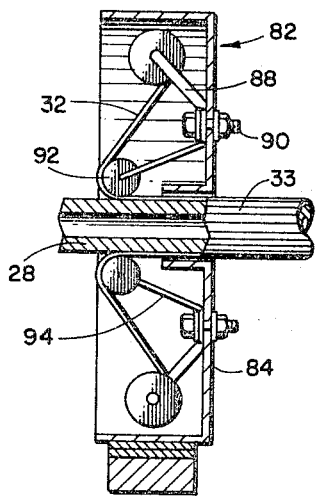
FIG. 3 is a sectioned view taken along lines 3—3 of FIG. 2 showing in detail the roller means supporting the longitudinal fibers.

To discuss the specific details of the device as briefly described above, reference is now had to FIGS. 2 and 3 disclosing the device 30 for laying the longitudinal fibers upon the mandrel. Seated within the base portion 34 is a cylindrically-shaped housing 82 having its axis correspond to the axis of the mandrel 28. The cylindrically-shaped housing 82 has one end thereof 84 closed to serve as a supporting structure. A plurality of spools 86 containing the longitudinal fibers are disposed completely over the inner periphery of the housing 82. The spools are supported in juxtaposition to the mandrel by means of support arms 88. The support arms are fixed at the end opposite that of the spool to the side 84 of the housing by means of a nut and bolt 90. The spools are supported such that the axes thereof are traversed to the axis of the mandrel. The filaments 32 coming off the spools 86 pass around rollers 92 prior to being laid down on the surface of the mandrel 28. The rollers 92 are positioned adjacent the surface of the mandrel by support arms 94 extending from the same bolt and nut arrangement 90 that support arms 88 for the spindles are attached to. As can be seen, there is no external energy utilized to rotate the spindle or rollers in this mechanism. The force of the pipe as it is being prepared further on along the device pulls the longitudinal fibers along the mandrel causing the spools to unwind. Conventional spool tensioning devices may be provided. After the fibers are initially taken around the rollers 92 prior to the beginning of the actual production of the pipe, the rollers 92 are then adjusted so as to maintain pressure and tension on the longitudinal filaments passing them on to the surface of the mandrel. As can be seen, especially in FIG. 2, the spindles are positioned adjacent each other such that the filaments coming off them as at 33 serve to cover the entire periphery of the mandrel once they are laid down upon it.

Figure 4:
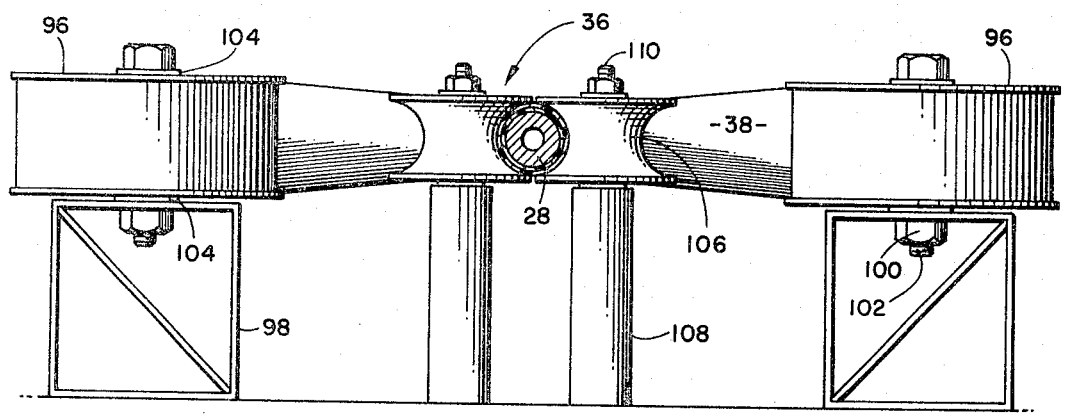
FIG. 4 is a detailed sectional view taken along line 4—4 of FIG. 1 showing in detail the mechanism for placing a liner material onto the pipe being formed.

Reference is now had to FIG. 4, particularly showing in detail the mechanism for placing the liner material over the longitudinal fibers during the formation of the pipe. The mechanism 36 is comprised of two spools 96 which store the liner 38 utilized. The spools are affixed to a support structure 98 by means of a nut 100 threaded to the end of the axle 102 about which the spool is free to spin. Washers 104 may be provided at each side of the spool to facilitate in its rotation about the axle 102. From the spindle 96 the liner is directed to two forming rollers 106 which together have a contour equal to that of the outer circumference of the mandrel 28, plus thickness of fibers 32 and liner material 38. The forming rollers 106 are supported by a support structure 108 and are free to rotate about an axle 110 at the top of this support structure. As can be seen, the width of the liner material is equivalent to one-half the circumference of the mandrel such that when the two tapes of half shells are laid down on the surface they completely surround the longitudinal fibers forming a small lap joint which is pressure and thermal bonded in the heating region. The liner material may be selected from compounds including polyvinylchloride, Mylar, rubber, Teflon or most any material that can be bonded by heat or resins. The liner material serves to seal the pipe since the resin might have small pinhole leaks after curing. The liner is not necessary in some low pressure applications.

Figure 5:
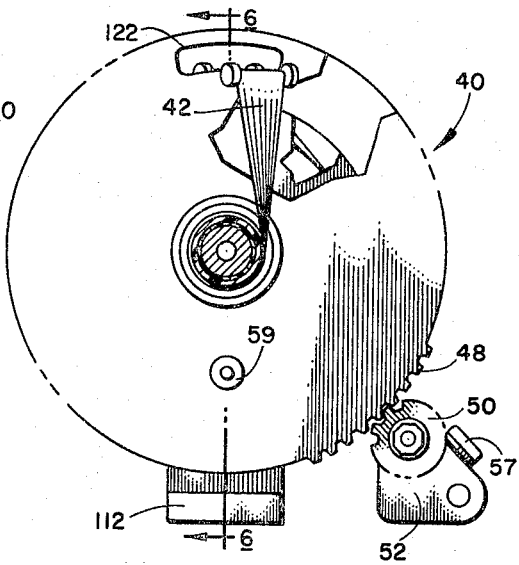
FIG. 5 is a detailed section view taken along line 5—5 of FIG. 1, particularly showing the transporting of the reinforcing circumferential fibers leaving the rollers onto the mandrel.
Figure 6:
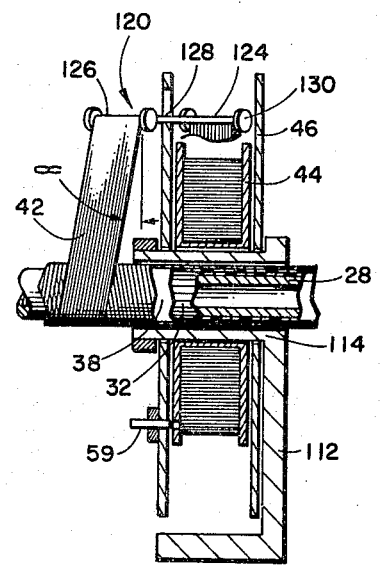
FIG. 6 is a detailed sectional view taken along line 6—6 of FIG. 5 showing the circumferential wrapping of the pipe with details of the storage mechanism.

Reference is now had to FIGS. 5 and 6 showing in detail the spindle mechanisms 40 applying the warp of circumferential filaments to the pipe being formed on the mandrel. A support structure 112 is provided at its uppermost end with an annular sleeve portion 114 which has an inside diameter slightly greater than that of the mandrel and material upon it. It is noted that this annular sleeve surrounds the mandrel with the then formed pipe upon it without touching the material. Thus, it does not serve in any way to support the mandrel. A large outer reel 46 is free to rotate about the annular sleeve 114 while a smaller reel 44 is situated concentrically within the outer reel and rotates therein. The inner reel 44 serves to carry the warp of fibers 42 coming from supply wheels 56 (FIG. 1). The fibers 42 coming off the inner reel 44 are directed over a guide frame structure 120. The guide frame structure 120 comprises a generally rectangular shape as particularly seen in FIG. 1. It extends partially within the outer reel 46 through an aperture 122 provided therein as seen in FIG. 5. A first side 124 of the frame is positioned adjacent the outer circumference of the inner reel while a second opposite side 126 is external to the outer reel and is positioned above the mandrel. The remaining two sides of the frame are welded at 128 where they intersect the outer reel 46 as they pass through the aperture 122. As a result, the guide frame structure 120 is permanently affixed to the outer reel and will rotate with it.

The frame structure 120 is positioned so as to provide an angle α for the warp of filaments being wound on the mandrel. Generally, the angle α is less than 45° from a line taken normal to the axis of the mandrel. Bosses 130 are present at first and second ends, respectively, of the frame member so as to prevent the warp of fibers from sliding off the frame. During the engagement of the gear 50 with the teeth 48 provided on the outer periphery of the outer reel 46, the outer reel is caused to rotate at a constant rate about the mandrel.

Though the frame 120 is shown as welded to the outer reel 46, it may be also pivotally connected thereto. In such an embodiment, the sides 124 and 126 would be provided with pivot points where they intersect the outer reel. The pivot points would be provided such that the tension coming off the spool equals the tension wrapping on the mandrel. Any change between these two tensions imparts a rotary motion to the frame 120. This either tightens or loosens a brake through a linkage system which tends to re-equalize the tension. Eddy current clutches on the frame further would act to regulate the tension. This described tensioning means is well known in the art of filament winding.

As the quantity of filaments on the inner reel 44 decreases, the reel will naturally revolve at more revolutions a minute since the filaments are being laid down on the mandrel at a constant rate. It is for this reason that the inner reel 44 revolves freely within the outer reel 46. As particularly seen in FIG. 1, it is preferable in the operation of the apparatus disclosed that half of the number of spindle mechanisms 40 wrap the circumferential filaments above the mandrel while the remainder or other half of the mechanisms are being rewound from the storage rollers 56. This then permits a continuous operation of the machine and does not necessitate its shutting down when all of the circumferential filaments are unwound from the spindles. It should be understood, of course, that the number of spindle mechanisms are shown by way of example only and the number can vary according to the specific application.

To rewind the inner spool 44 of mechanism 40 from the filament supply spool 56, gear 50 is neutralized by a switching mechanism 57 on gearbox 52. Locking pin 59 is then manually engaged securing spools 46 and 44 together. Gear 50 is subsequentially reversed to a higher gear ratio to rewind spool 44. By stepping up the gears from, for example, a one to one winding ratio to a one and one-half to one rewinding ratio, it is possible to load spool 44 at a faster rate than the subsequent spools are unwinding, thereby insuring a ready supply of filaments for a continuous operation.

The fibers used in making the pipe can be glass roving or tape. Additionally, very fine wires made out of high strength alloys or metals made into roving or belts may be employed. The wires are bonded with a suitable resin or chemical bonding agent such as epoxy and polyester resins. Mixtures of the above fibers with asbestos, paper, jute, nylon, Dacron and the like or these materials alone are also contemplated.

Figure 8:
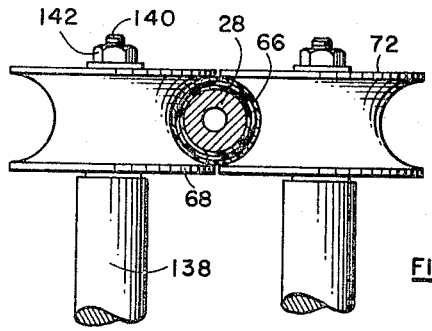
FIG. 8 is a sectional detailed view taken along line 8—8 of FIG. 1 particularly showing the rollers forming the flexible metal band to enclose the pipe being formed.
Figure 7:
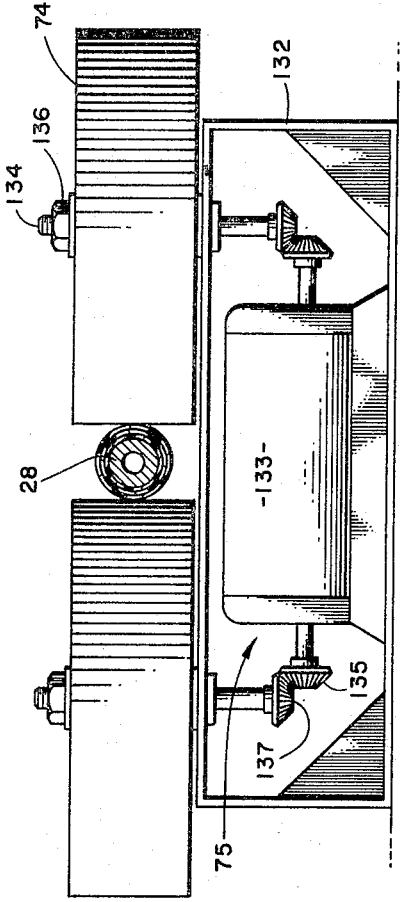
FIG. 7 is a sectional view taken along line 7—7 of FIG. 1 disclosing the relationship of the rollers supporting an endless metal band with relation to the mandrel and pipe being formed.

After passing the stage of the spindle mechanisms, the pipe is essentially complete except for the curing thereof. It has been found that the most successful curing of the filament wound pipe occurs if substantial pressure is applied to the outer surface thereof during a curing step. In order to accomplish this, referring again to FIG. 1, the material upon the mandrel is directed upon leaving the spindle mechanisms to a pair of rollers 64 which serve to guide metal bands or belts 66 onto the outer surface of the pipe. The rollers are supported by a frame structure 132. An axle 134 passes through the axis of the rollers and is rigidly affixed to the rollers by a nut 136. The belt support rollers are shown in detail in FIG. 7 wherein the second set 74 of such rollers are disclosed to better point out the drive mechanism in order to cause the continuous belts 66 to rotate and thus pull the pipe along the mandrel. A motor 133 is supported between the two rollers driving bevel gears 135. The bevel gears 135 engage bevel gears 137 affixed to the axle 134 of the rollers. This results in rotating the two rollers oppositely to cause the necessary advancement of the belts. As can be seen at this point (FIG. 1), the two continuous flexible metal bands 66 are merely tangent to the surface of the pipe. The metal bands may be formed around and in contact with the entire outer circumference of the formed pipe by a pair of forming rollers 68 are provided adjacent the rollers 64, immediately preceding the entry of the pipe into the heater 70. The forming rollers as seen in FIG. 8 correspond to the outer circumference of the formed pipe and bend the continuous metal bands around the circumference. The rollers 72 are supported by arms 138 and rotate about an axle 140 to which they are affixed by nut 142, permitting them to turn freely about their axes. The metal bands thus formed about the circumference of the pipe are maintained in this position as hereafter explained throughout the heater region 70 as seen in FIG. 1 and are not removed until the pipe is in a solid cured form as it leaves the heater. A second pair of forming rollers 72 are adjacent the end of the heater as well as a second pair of rollers 74 for the transportation of the metal band.

Figure 9:
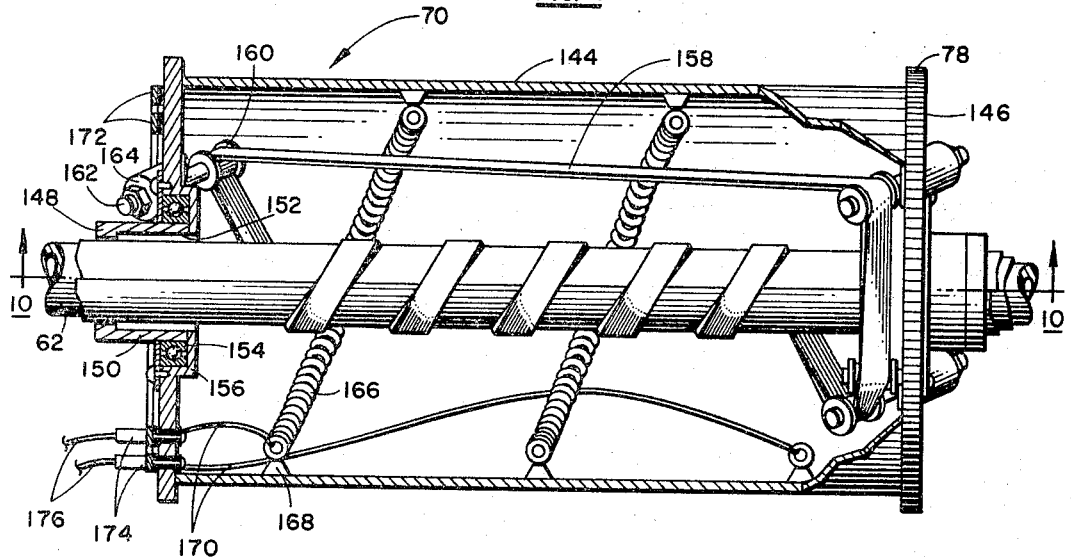
FIG. 9 is a partially-sectioned top view of the heating region of the device taken along line 9—9 of FIG. 1.

The curing of the formed pipe takes place in the heating mechanism or chamber 70 as shown in FIG. 9. The heating chamber comprises a cylindrical housing 144 having closed end portions 146. The end portions are provided with geared teeth 78 about the circumference thereof as previously described. These gear teeth engage a gear 76 driven by gear box 80 as seen in FIG. 1. The rotation of the gear 76 drives the cylindrically-shaped chamber 70 about an axis corresponding to the mandrel. The heater mechanism is supported at each end by two upright support arms 148, as particularly seen in FIG. 1. At the top of the support arms there is provided an annular sleeve 150 which surrounds the mandrel and fits within an aperture 152 provided within each end of the heater. Conventional ball bearings 154 surround the sleeve 150 where it intersects the end 146 of the house of the heating chamber. The ball bearings are seated within a housing 156 which serves to insulate them from the heat and keep them lubricated. This arrangement permits the heating mechanisms 70 to continuously revolve about its axis while benig adequately supported.

Within the heating chamber, a band of material 158 made of stainless steel, silicon steel, silicone rubber reinforced with steel and the like is spirally wrapped several times about the continuous metal bands 66, tightly compressing and holding the metal bands about the pipe. This band 158 is stretched between three rollers 160 which extend within the housing 144. In the particular arrangement shown, two of the rollers 160 are at one end of the housing while the third end is at the opposite end of the housing with the continuous band passing over all three. Each roller is attached to an axle 162 which extends through the end 146 of the chamber into a sealed bearing 164 mounted external of the housing. The axle 160 is preferably rigidly affixed to the rollers 160 such that the rollers turn with the axle and the friction developed is absorbed in the enclosed bearing 164. Since all of the rollers 160 are in a fixed rigid position relative to the mandrel, when the heating mechanism 70 is rotated about its axis, the band of material 158 continuously rotates about the three rollers and applies pressure to the moving metal bands. The gear boxes 80 which serve to rotate the heating mechanism are synchronized through motor 81 such that the rate at which the heater revolves corresponds to the rate which the continuous metal bands 66 passes therethrough so that the action of the band of material 158 about the metal bands 66 is a continuous, smooth operation. The action of the band of material 158, and the continuous metal bands 66 about the pipe serve to pull it along the mandrel. Because of this effect, the mandrel and the pipe never rotate, eliminating any rotational friction. Additionally disposed spirally within the heating mechanism 70, heating coils 166 which are of a material such as Nichrome wire, stainless steel or other similar material. The heating coils 166 are positioned adjacent the inner surface of the cylindrical housing 144 and are held in position by insulators 168. The coils 166 are resistively heated through electricity conducted in lines 170. The leads 170 are attached to commutator rings 172 on one of the ends 146 of the heating mechanism. External brushes 174 having electrical leads 176 thereto are in contact with the commutator ring 172 and introduce the electrical current for the resistively heated elements. The length and design of the heating mechanism 70 and the quantity of heat generated therein is governed by the type of binder material utilized and the amount of time required to sufficiently cure the product. After the pipe has traversed the length of the heater and is emitted therefrom, it is in a solid, cured, usable state.

Figure 10:
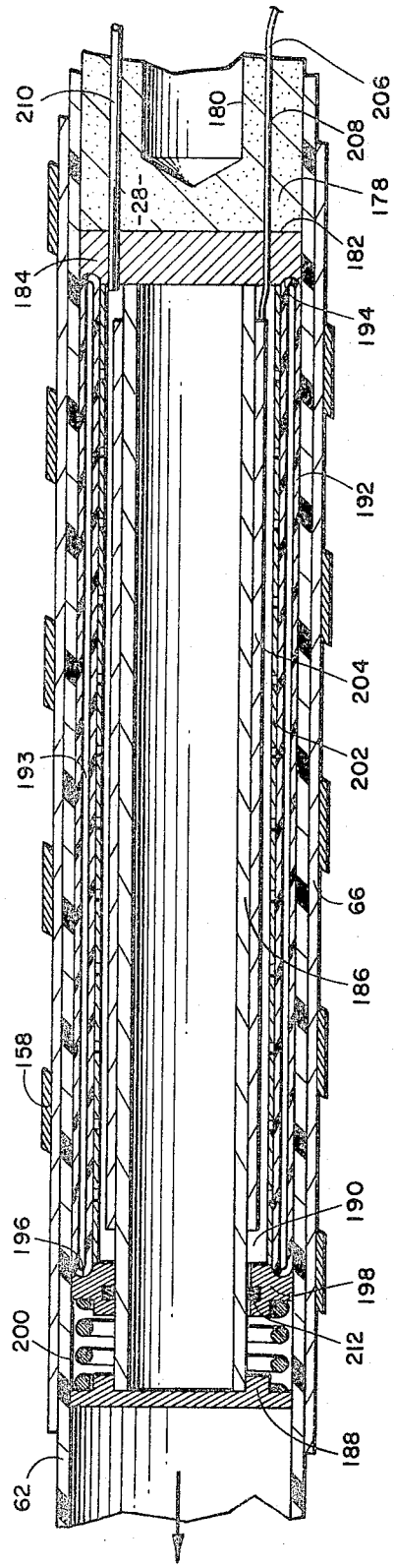
FIG. 10 is a detailed-sectioned view taken along the line 10—10 of FIG. 9 showing in detail the mandrel and heater configuration in the curing portion of the device.

One of the particularly novel aspects of the invention as previously indicated, is the novel mandrel utilized. The details of the mandrel and the preferred embodiment is particularly shown in FIG. 10. From the point where the mandrel 28 contacts the tank 20 (FIG. 1) to where the mandrel intersects the heating mechanism 70, it is comprised of a porous material 178. It is preferable that the mandrel be of porous sintered metal, such as sintered bronze, steel, stainless steel and various alloys. Also, ceramics are preferred such as cermets, metal reinforced ceramics and the like. The mandrel has an aperture 180 extending longitudinally therethrough its entire length. The material in the tank 20 which is under pressure flows through the aperture 180 and permeates the porous material 178 coating the surface of the mandrel providing lubrication for the moving pipe thereon. Additionally, since this material is preferably a binder composition it serves to provide better cohesion for the filaments at the inner periphery of the pipe when they are cured in the heater region. At the terminal end 182 of the porous mandrel there is present a circular disc endpiece 184. A tubular structure 186 extends the length of the heating chamber from the first endpiece 184 to a second endpiece 188. The diameter of the two endpieces 184 and 188 is equal to that of the inside diameter of the pipe formed so that they serve as a continuation of the mandrel. The diameter of the tubular member 186 is considerably smaller than that of the endpieces. This tubular structure serves to rigidly support the two endpieces relative to each other and to form a chamber 190 between it and the formed pipe 62 moving over the two endpieces.

A double-walled bladder 192 which may be made of silicone rubber is positioned at one end thereof at outer circumference of endpiece 184. Within the bladder is a fluid 193. The bladder 192 is positioned within a notched portion 194 of the endpiece 184 to form a seal at this endpiece. The opposite end of the bladder is positioned within notched portions 196 of a circumferential ring 198 which surrounds the tubular structure 186 and is dispersed adjacent the second endpiece 188 and is separated therefrom by a spring 200. The spring serves to maintain tension on the ring 198 so as to keep a good seal between it and the bladder 192. The bladder 192 is double-walled cylindrically-shaped continuous piece of a rubber-type material. As the pipe moves along the mandrel in the heating region, it slides along and it is in contact with the bladder throughout the region of the heating mechanism. Due to the construction of this bladder, it will continually rotate longitudinally between the first endpiece 184 and the ring 198 as the pipe is moving over it. The frictional sliding force of the inner surface of the pipe on the bladder causes this rotation. The inside surface of the bladder is in contact with a perforated steel tube 202 which extends also between the first endpiece 184 and the ring structure 196–198. The tube 202 is welded to the first endpiece 184 so as to fixedly secure it in place. The tube 202 is not so welded to the ring structure 198 to allow movement of the ring against the bladder. Contact is made between tube 202 and ring 196–198 by the force of the spring 200 pushing the ring against the tube. The perforated tube 202 is preferably Teflon-coated so as to provide a smooth surface upon which the bladder may slide as it is in continuous movement.

Immediately surrounding the inner tubular structure 186 is cylindrical heating element 204. This element is resistively heated through electrical leads 206 which are brought through the porous portion of the mandrel in the channels 208 provided. The heating element may be made of a material such as Calrod. The heating element to heat a liquid such as water which is admitted to the chamber 190 by lead 210 which extends through the porous portion of the mandrel from the tank 20. Heating this fluid causes vapor to be forced through the apertures in the perforated tube 202 causing pressure on the rotating bladder 192. As a result, internal pressure is continuously exerted against the inside of the pipe 62 as it is being cured. This internal pressure is in addition to the external pressure exerted upon it by the continuous metal bands 66 and band of material 158 surrounding the two metal bands 66. This internal and external pressure exerted upon the pipe during the curing stage is believed to be one of the important criteria for producing a plastic pipe of high quality and consistency.

Since it is undesirable for the liquid utilized in the chamber to leak without the chamber, the chamber is essentially sealed by the engagement of the bladder in the first endpiece 184 at the notched portion 194 and likewise at the ring member 198 due to the notched portion 196 therein. Additionally, an O-ring seal 212 is provided within the ring 198 in contact with the inner tube 186 to prevent any leakage of the fluid therebetween. The spring 200 serves to maintain sufficient pressure on the ring 198 so that a good seal is maintained between it and the bladder.

Various binder materials may be utilized for bonding the fibers to make the pipe. These include epoxy and polyester resins in addition to various photo-catalyzed resins or any other suitable curable binder media. Though the curing has been shown by way of specific example as being a heating element, the polymeric binder material may be cured by hot air heating, high frequency electromagnetic waves, and by hysteresis. Additionally, with particular polymeric binders, a carbon arc may be utilized for photocatalyzed action to cure the binder.

To start the manufacture of the pipe, a tubular sleeve can be placed about the mandrel extending the entire length thereof. The longitudinal fibers are then manually fastened to this tubular member which may be provided, for example, with a notched portion to receive them. The machine is then started and the liner material will be placed down upon the longitudinal fibers. Additionally, the circumferential fibers are manually placed on top of the liner and secured until one complete pass about the circumference about the pipe is made. The additional fibers laid down on top of the liner will permanently secure them about the pipe. As can be seen, the tubular sleeve will be engaged by the endless belts in the heater region in the device pulling it along the mandrel. This action will impart the initial impetus to the device and start the pipe-making process.

As can be seen from the above description of the apparatus of the invention, a continuous pipe is manufactured. This pipe may be readily laid down, from a portable pipemanufacturing machine as described, in ditches or other areas over great lengths since there is no rotation of the pipe on the mandrel. This provides for great flexibility in the utilization of the apparatus for the manufacture of the pipe.

Although the invention has been described and illustrated in detail, it is to be clearly understood that the same is by way of illustration and example only and is not to be taken by way of limitation, the spirit and scope of this invention being limited only by the terms of the appended claims.

We claim:
1. An apparatus for making plastic pipe comprising:
 a rigid mandrel,
 means for laying down resin-impregnated reinforcing fibers about said mandrel to form an uncured pipe,
 means surrounding said uncured pipe for advancing the uncured pipe longitudinally along said mandrel comprising:
  a continuous belt assembly bent to encompass said uncured pipe about said mandrel,
  a continuous single band spirally wrapped about said belt assembly to compress said belt assembly about said uncured pipe,
  means for rotating said continuous single band around said belt assembly,
 and means disposed about said mandrel for curing said uncured pipe to form a solid structure.

2. An apparatus for making plastic pipe comprising:
 a rigid elongated cylindrically-shaped mandrel,
 means surrounding said mandrel for placing resin-impregnated fibers entirely about the circumference of said mandrel to form an uncured pipe,
 means disposed about said mandrel downstream from said fiber placing means for curing said resin-impregnated fiber to a solid pipe comprising:
  a closed-end cylindrically shaped housing whose center axis is coincident with the axis of the mandrel,
  heating means disposed within said housing,
 means adjacent said mandrel for advancing the uncured pipe along said mandrel,
 and wherein the mandrel section within said curing means comprises:
  an inner tubular member,
  a double-walled continuous flexible tubular bladder disposed concentrically about said tubular member, said bladder positioned for contact with the inner surface of the pipe being formed,
  and means for supporting said bladder about said tubular member to allow said bladder to freely rotate longitudinally in a fixed axial position due to frictional engagement with said pipe.

3. The device of claim 2 wherein the mandrel section within said curing means comprises:
 an inner tubular member,
 a double-walled continuous flexible tubular bladder disposed concentrically about said tubular member, said bladder positioned for contact with the inner surface of the pipe formed.

4. The device of claim 2 additionally comprising:
 means disposed between said tubular means and said bladder for exerting radial pressure on said bladder.

5. The device of claim 2 wherein said pressure exerting means comprises:
 means for supplying a fluid,
 and means for heating the fluid supplied whereby said fluid is caused to expand against said bladder.

6. The device of claim 2 wherein said advancing means comprises:
 a plurality of endless belts disposed around rollers fixedly secured adjacent to said mandrel,
 and means for tightly bending said belts about the pipe being formed on said mandrel.

7. The device of claim 6 additionally comprising:
 a continuous band spirally wrapped about said endless belt assembly within said curing means,
 a plurality of support means affixed to the inner walls of said housing about which said spirally wrapped belt rotates,
 and means for rotating said cylindrically shaped housing about its axis whereby said spirally-wrapped belt rotates on said support means.

8. A device for curing a plastic pipe of resin-impregnated reinforcing fibers comprising:
 a mandrel on which said pipe is formed,
 a heating chamber means disposed about said mandrel,
 a plurality of endless belts disposed around rollers fixedly secured adjacent to said mandrel constituting a belt assembly,
 means for tightly bending said belts about said pipe,
 a continuous band spirally wrapped about said endless belt assembly and said pipe within said heating means,
 a plurality of support means situated within said heating means about which said spirally-wrapped band rotates.

9. A device for curing a plastic pipe of resin-impregnated reinforcing fibers comprising:
 a mandrel on which said pipe is formed,
 a heating chamber means disposed about said mandrel,
 a plurality of endless belts disposed around rollers fixedly secured adjacent to said mandrel,
 and means for tightly bending said belts about said pipe, wherein said mandrel comprising:
  an inner tubular member,
  a double-walled continuous flexible tubular bladder disposed concentrically about said tubular member, said bladder positioned for contact with the inner surface of the pipe being formed,
  and means for supporting said bladder about said tubular member to allow said bladder to freely rotate longitudinally in a fixed axial position due to frictional engagement with said pipe.

10. The device of claim 9 additionally comprising:
 means disposed between said tubular means and said bladder for exerting radial pressure on said bladder.

11. The device of claim 10 wherein said pressure exerting means comprises:
 means for supplying a fluid,
 and means for heating the fluid supplied whereby said fluid is caused to expand against said bladder.

References Cited

UNITED STATES PATENTS

| | | | |
|---|---|---|---|
| 2,558,849 | 7/1951 | Hodge | 156—425 X |
| 2,723,426 | 11/1955 | Pelley | 156—285 |
| 2,941,570 | 6/1960 | Plym | 156—443 X |
| 3,023,787 | 3/1962 | Phillips et al. | 156—149 X |
| 3,068,134 | 12/1962 | Cilker et al. | 156—443 X |
| 3,177,105 | 4/1965 | Wiltshire | 156—285 X |

FOREIGN PATENTS 494,038 10/1938 Great Britain.

EARL M. BERGERT, *Primary Examiner.*

P. DIER, *Assistant Examiner.*